United States Patent [19]

Kojima et al.

[11] Patent Number: 4,671,684
[45] Date of Patent: Jun. 9, 1987

[54] ELECTRONIC TYPEWRITER WITH SELECTIVELY DEACTUATABLE SPELLING CHECKING APPARATUS

[75] Inventors: Yasumichi Kojima; Hideo Ueno, both of Nagoya; Yasuhiro Hayashi, Toyoake; Makoto Suzuki, Nagoya; Satoshi Furukawa, Suzuka, all of Japan

[73] Assignee: Brother Kogyo Kabushiki Kaisha, Aichi, Japan

[21] Appl. No.: 778,305

[22] Filed: Sep. 20, 1985

[30] Foreign Application Priority Data

Sep. 20, 1984 [JP] Japan ................................ 59-197266

[51] Int. Cl.⁴ .............................................. B41J 5/30
[52] U.S. Cl. ...................................... 400/63; 400/61; 364/900
[58] Field of Search ......................... 400/63, 70, 61; 364/200 MS File, 900 MS File

[56] References Cited

U.S. PATENT DOCUMENTS 4,136,395  1/1979  Kolpek et al.
4,456,969  6/1984  Herzik et al. .................... 364/900

OTHER PUBLICATIONS

"Eight Bit Character Encoding for Multiple Languages"; V. A. Mayfield; *IBM Technical Disclosure Bulletin;* vol. 26, No. 2, p. 537; Jul. 1983.

*Primary Examiner*—Edgar S. Burr
*Assistant Examiner*—David A. Wiecking
*Attorney, Agent, or Firm*—Parkhurst & Oliff

[57] ABSTRACT

An electronic typewriter, comprising: (a) a keyboard (2) generating a signal corresponding to a depressed key and comprising at least a plurality of character keys (5) for inputting character data, a space key (4) for separating said character data into words and a release key (6), a dictionary memory (12) for storing a plurality of words, a working memory (13) for sequentially storing said plurality of words, a spelling check control means (11) for reading out word data from said dictionary memory (12) as well as said plurality of words inputted via said keyboard, comparing the spelling of said words with said word data, and judging whether or not the spelling of said words is correct, means for disabling said spelling check control means (11), said means disabling said spelling check control means (11) only for a first word inputted after the depression of said release key (6) of said keyboard (2), and visible outputting means (8), (9) for outputting input data visibly.

15 Claims, 6 Drawing Figures

ELECTRONIC TYPEWRITER WITH SELECTIVELY DEACTUATABLE SPELLING CHECKING APPARATUS

BACKGROUND OF THE INVENTION

1. Field of the Invention

The present invention relates to electronic typewriters, and more specifically to electronic typewriters wherein a spelling check of inputted alphabetic words is performed.

2. Description of the Prior Art

Some electronic typewriters and alphabetic word processors in the prior art are provided with an electronic dictionary which stores a number of alphabetic words, so that an inputted alphabetic word is compared with the alphabetic data stored in the electronic dictionary and a decision (spelling check function) is effected as to whether the inputted alphabetic word is spelled correctly or not.

In all of these electronic typewriters, however, since the spelling check is performed in a unified manner for all the inputted alphabetic words, when an alphabetic word such as a personal name, place name or technical term which is not stored in the electronic dictionary is inputted, it may be interpreted as misspelled, even though spelled correctly. Consequently, these typewriters have problems in making the document inputting operation efficient.

SUMMARY OF THE INVENTION

In order to solve the above-mentioned problems in the prior art, it is an object of the present invention to provide an electronic typewriter wherein the spelling check function is not performed when a specific alphabetic word, e.g. a proper noun such as a personal name, place name or technical term, is inputted, thereby increasing the speed and efficiency of the document inputting operation.

Accordingly, subject-matter of the present invention is in an electronic typewriter comprising:

(a) a keyboard (2) generating a signal corresponding to a depressed key and comprising at least character keys (5) for inputting character data, a space key (4) for separating said character data into words, and a release key (6);

(b) a dictionary memory (12) for storing a plurality of words;

(c) a working memory (13) for sequentially storing said plurality of words;

(d) a spelling check control means (11) for reading out word data from said dictionary memory (12) as well as said plurality of words from said working memory (13), comparing the spelling of said plurality of words with said word data to judge whether or not the word data corresponding to the spelling of said plurality of words exists in said dictionary memory (12);

(e) means for disabling said spelling check control means (11) from judging whether corresponding word data exists or not only for a first word inputted after the depression of said release key (6) of said keyboard (2); and (f) visible outputting means (8), (9) for outputting input data visibly. dr

BRIEF DESCRIPTION OF THE DRAWINGS

An embodiment of the invention will now be described, with reference to the accompanying drawings, in which.

DETAILED DESCRIPTION OF THE PREFERRED EMBODIMENT

Figure 1:
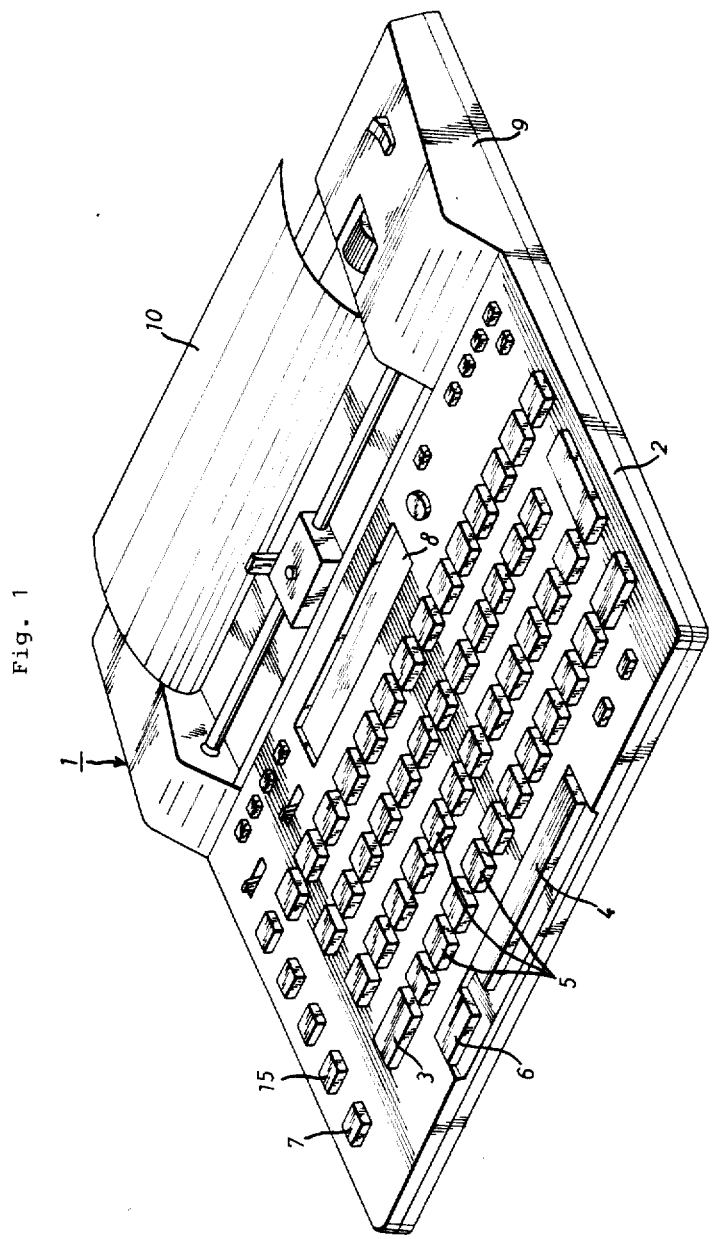
FIG. 1 is a perspective view of an electronic typewriter of the present invention.

In FIG. 1, an electronic typewriter 1 comprises a keyboard 2 and various keys such as a shift key 3, a space key 4 to separate input words and a plurality of character keys 5 as input keys installed on the keyboard 2. If the character keys are depressed, various character data such as alphabetic or numeric data corresponding to the respective character keys 5 are selectively inputted. A release key 6 is installed to the left of the space key 4 and used when spelling check is not to be performed. A pass key 7 is installed to the left of the shift key 3 and used when an alphabetic word determined by the spelling check means to be misspelled is corrected.

A liquid crystal display 8 is installed as displaying means on the rear center position of the keyboard 2, and an alphabetic word inputted by the character keys 5 is displayed on the display 8. A printer 9 is installed on the rear side of the keyboard 2, so that an alphabetic word inputted by the space key 4 and the character keys 5 is printed on a printing paper 10.

A microprocessor contained in the electronic typewriter 1 of the present invention will now be described.

Figure 2:
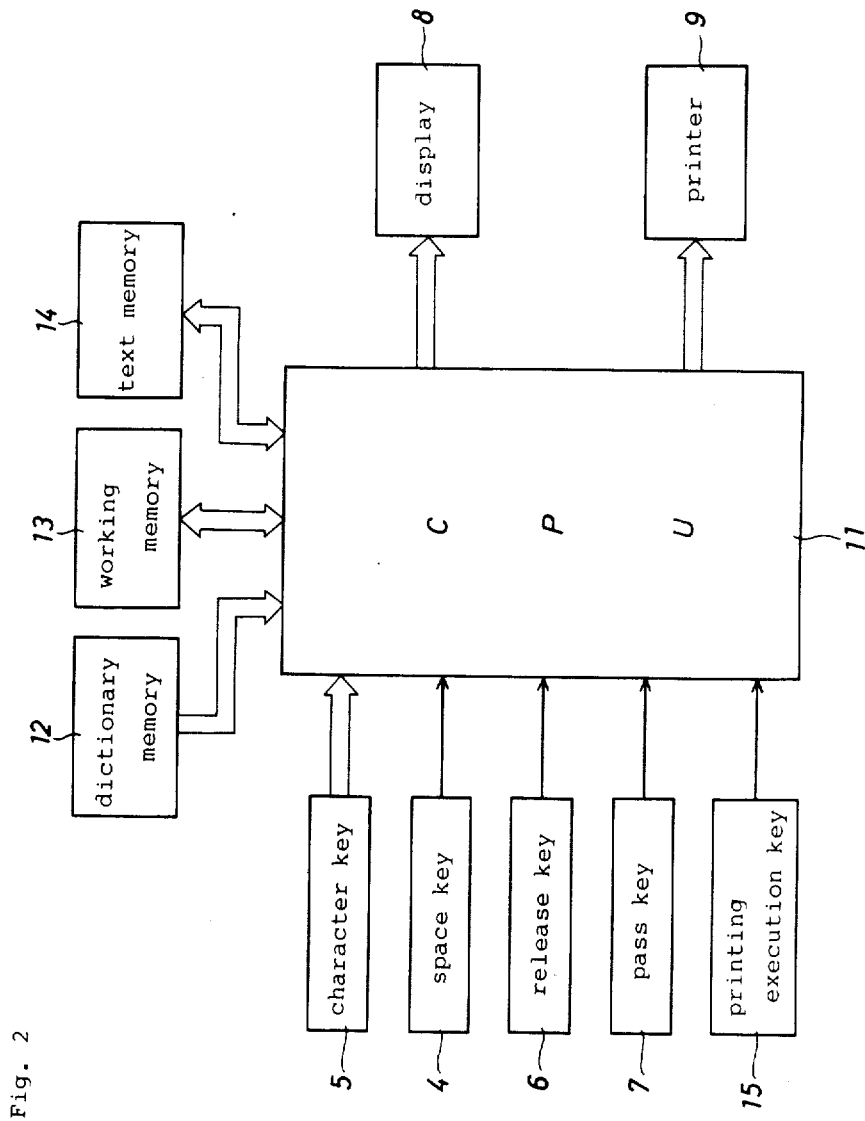
FIG. 2 is a block diagram of electrical circuit connection of the electronc typewriter in FIG. 1.

In FIG. 2, a central processing unit 11 (hereinafter referred to as "CPU") functions as a spelling check control means and inputs ON signals according to the depression of various keys such as the space key 4, the character keys 5, the release key 6 installed on the keyboard 2. The CPU 11 also displays characters onto the display 8 based on the input signals from the character keys 5. In the CPU 11, a character group previously inputted via the character keys 5 is defined as one alphabetic word in response to the ON signal from the space key 4.

A dictionary memory 12 is a read only memory (ROM) to store alphabetic data composed of a plurality of alphabetic words. A working memory 13 is a random access memory (RAM) to store alphabetic words inputted by the character keys 5 and the space key 4 and the alphabetic data read from the dictionary memory 12 by the CPU 11. A text memory 14 is a random access memory (RAM) to store alphabetic sentences inputted by the character keys 5 and the space key 4.

In performing the spelling check function, the CPU 11 sets a check flag within the CPU 11 to a logical "1" upon the depression of the space key 4, thereby enabling the spelling check mode. When the CPU 11 is in the check mode (when the check flag is "1"), the character group previously inputted by the operation of the character keys 5 is defined as one alphabetic word after an ON signal caused by the depression of the space key 4, and the spelling check is performed to determine whether or not the spelling of the alphabetic word is correct.

The spelling check is performed by comparing the inputted alphabetic word with a plurality of individual alphabetic words stored in the dictionary memory 12. Specifically, the CPU 11 sequentially reads out the alphabetic data stored in the dictionary memory 12 and judges whether or not any of the words stored in the dictionary memory match the alphabetic word. If there is a match, the CPU 11 concludes that the inputted alphabetic word is spelled correctly, stores it in the text memory 14 and then waits for a next alphabetic word to be inputted.

If there is no matching alphabetic data in the dictionary memory, the CPU 11 concludes that the inputted alphabetic word is misspelled and the alphabetic word on the display 8 flashes. The character keys 5 are then used to correct the spelling of the alphabetic word on the display. A second spelling check identical to that described above is then performed to confirm that the revised spelling is correct. If the spelling is correct, the word is stored in the text memory 14 and the following word is inputted. If it is not correct, the same operation described above is repeated.

To input the flashing alphabetic word displayed on the display 8 into the text memory 14, the pass key 7 is operated and the CPU 11 stores the alphabetic word as spelled in the text memory 14 in response to the ON signal of the pass key 7 and waits for the input of the next alphabetic word.

The check fla is set to a logical "0" by the CPU 11 in response to an ON signal generated by the depression of the release key 6 thereby disabling the spelling check mode. If the CPU 11 disables the spelling check mode, the spelling check is not performed and normal processing is executed so that an inputted alphabetic word is stored intact in the text memory 14 and the next alphabetic word input is processed.

The CPU 11 drives the printer 9 in response to an ON signal from the printing execution key 15 installed at the rear side of the pass key 7, so that alphabetic sentences stored in the text memory 14 are printed onto the printing paper 10.

The operation of the electronic typewriter described above will now be described.

If the power switch of the electronc typewriter 1 is turned on, then the CPU 11 is initialized, the check flag within the CPU is set to "1" and the CPU 11 awaits the operation of the various keys on the keyboard 2. During this waiting period, if the character keys 5 are operated so as to input an alphabetic word (step 1), and the CPU 11 determines that the release key 6 and the space key 4 are not operated but the character keys 5 are operated (steps 2, 3), then the character data corresponding to the operated character keys 5 is stored in the working memory 13. At the same time, the characters are displayed on the display 8 (steps 4, 5) and the CPU 11 waits for the next character input.

If the input of one alphabetic word is finished as signalled by character key operation and the depression of the space key 4 (step 1), the CPU 11 acknowledges the space key 4 input (step 3), and checks the state of the check flag (step 6).

Since the check flag is initially set to "1", the characters inputted by the character keys 5 are stored in the working memory 13 as one alphabetic word and the spelling check is executed to determine whether or not the alphabetic word is spelled correctly (step 7). In order to determine whether or not an alphabetic word matching the inputted alphabetic word exists in the dictionary memory 12, the CPU 11 sequentially reads out the alphabetic data from the memory 12 and compares the two.

If matching alphabetic data exists, the CPU 11 concludes that the inputted alphabetic word is spelled correctly (step 8), stores the alphabetic word in the text memory 14 (step 9), and waits for the input of the next alphabetic word.

If matching alphabetic data does not exist, the CPU 11 concludes that the inputted word is misspelled (step 8) and the alphabetic word on the display 8 flashes (step 10) so as to inform the operator of this fact. The CPU 11 then waits for additional character key inputs to correct the alphabetic word. This is done by operating the character keys 5 so as to input a correct alphabetic word (step 11) after the CPU 11 has disabled the pass key 7 and the space key 4 (steps 12, 13), and the character data previously stored is then replaced by the new character input from the character keys 5 and stored in the working memory 13. At the same time, the new characters are displayed on the display 8 (steps 14, 15), and the next character input is awaited (step 16).

When the correction of the alphabetic word is finished and the space key 4 is operated (step 16), the CPU 11 recognizes the space key 4 operation (step 13), and executes the spelling check again (step 7). If the CPU 11 concludes the spelling is correct (step 8), the alphabetic word is stored in the text memory 14 as described above (step 9), and the CPU 11 waits for the input of the next alphabetic word.

If during the key operation to input a correct alphabetic word (step 11), the pass key 7 is operated, the CPU 11 responds by storing the previously inputted alphabetic word without correction in the text memory 14 (step 9), and then waits for the input of the next alphabetic word.

If the release key 6 is operated to signal the pending input of a proper noun which is not stored in the dictionary memory 12 (step 1), the CPU 11 responds to the ON signal (step 2) and resets the check flag from "1" to "0", i.e., from the spelling check mode to the check release mode (step 17), and waits for the key operation to input the proper noun (step 1). If the character keys 5 are operated as described above so as to input alphabetic characters and the space key 4 is operated after the proper noun has been inputted (step 1), the CPU 11 recognizes the operation of space key 4 (step 3), and checks the state of the check flag (step 6). Since the flag is "0", the CPU 11, resets the flag to "1", i.e. back to the spelling check mode (step 18), and then the input character group (proper noun) is stored in the text memory 14 (step 9). The CPU 11 then waits for the input of the next alphabetic word with the spelling check means enabled.

Consequently, in this case, since the spelling check is not performed, the word input operation is performed more rapidly. Moreover, since the key operations to correct the alphabetic word described above (step 11) are not required, the input of alphabetic sentences is achieved more quickly.

When the input of sentences composed of alphabetic words spelled correctly to the text memory 14 is finished and the print execution key 15 is operated, the CPU 11 responds to the ON signal and reads out the document data stored in the text memory 14. The printer 9 is then driven on the basis of this data so that the sentences are printed onto the printing paper 10.

In the embodiment described above, every time an ordinary alphabetic word is inputted, the spelling check is performed, thereby ensuring the correct input of the alphabetic word. In order to input proper nouns such as personal names, which are not stored in the dictionary memroy 12, the release key 6 is operated to disable the spelling check means and other operations required by the spelling check, so that the key operation for the input of the proper noun may be immediately performed.

Moreover, when the spelling check is not performed, if the space key 4 is operated, the check flag is automatically reset from "0" to "1", that is, from the check release mode to the spelling check mode. Consequently, troublesome key operation to re-enter the spelling check mode is unnecessary.

Figure 3A:
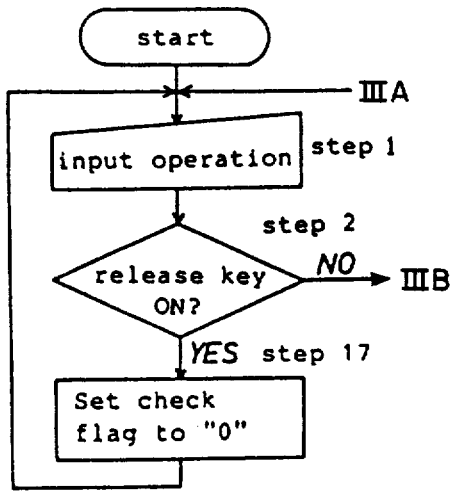
FIGS. 3A, 3B, 3C and 3D are sequential flow charts of the control program for the electronic typewriter with deactuatable spell checking apparatus in accordance with the invention.
Figure 3B:
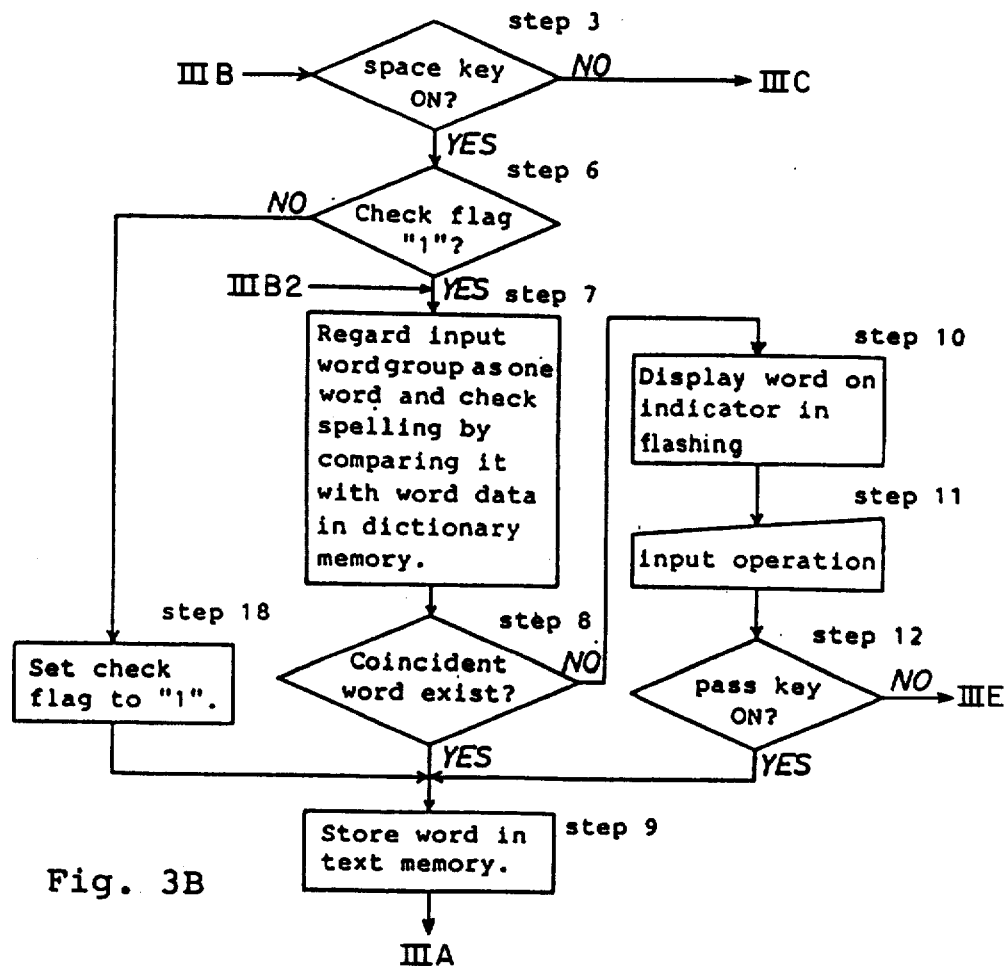
Figure 3C:
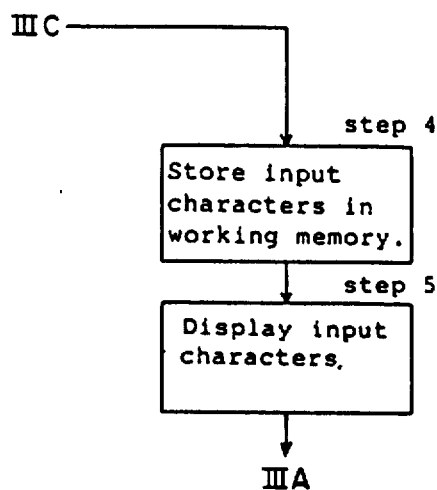
Figure 3D:
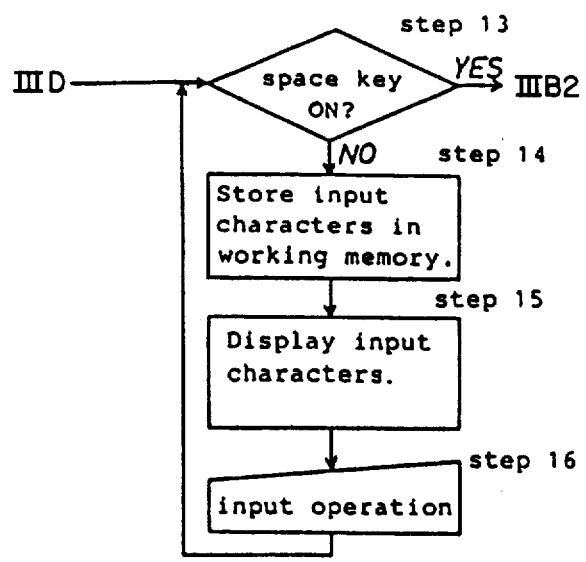

The invention is not restricted to the above embodiment. For example, although the CPU 11 drives the printer 9 based on operation of the printing execution key 15, and the inputted sentences are printed on the printing paper 10, at the step 9 of FIG. 3B (storage of the inputted alphabetic word into the text memory 14), the printer 9 may also be driven to print the alphabetic word onto the printing paper 10.

It is also possible to execute the spelling checks in a bundle. To do this, data representing the spelling check flag (based on the operation of the release key 6) is stored together with the alphabetic word into the text memory 14 whenever the release key 6 is operated and the spelling check is not required for the alphabetic word. Also, the spelling check execution data based on the non-operation of the release key 6 can be stored together with the alphabetic data in the text memory 14 if the release key 6 is not operated and the spelling check is required for the alphabetic word.

When the spelling check is performed on a bundle of alphabetic words stored in the text memory 14, the CPU 11 sequentially reads out the alphabetic data from the text memory 14, and the spelling check of the alphabetic word is executed or not executed depending on the data representing the spelling check flag or the spelling check execution data contained in the readout alphabetic word data.

We claim:

1. An electronic typewriter comprising:
   (a) a keyboard generating a signal corresponding to a depressed key and comprising at least character keys for inputting character data, a space key for separating said inputted character data into groups, each of said groups forming an inputted word, and a release key;
   (b) a dictionary memory for storing a plurality of word data;
   (c) a working memory for storing said inputted word;
   (d) a spelling check control means for reading word data from said dictionary memory and said inputted word from said working memory and comparing the spelling of said inputted word with said word data;
   (e) means responsive to operation of said release key for disabling said spelling check control means from checking the spelling of only a first word inputted after the depression of said release key and for reenabling said spelling check control means after said first word has been inputted; and
   (f) visible outputting means for displaying said inputted character data.

2. An electronic typewriter according to claim 1, further comprising:
   (e1) means for setting a digital signal indicative of the disabling of said spelling check control means in accordance with a depression of said release key;
   (e2) means for judging the state of said digital signal in accordance with a depression of said space key; and
   (e3) means for enabling said spelling check control means comprising resetting said digital signal.

3. An electronic typewriter according to claim 1, wherein said spelling check control means determines whether or not said corresponding word data exists every time said space key is depressed and comprises a correcting control means for storing a word newly inputted by said character keys and separated by said space key as a corrected word in said working memory without said space key or a pass key being depressed, said spelling check control means determining whether or not word data corresponding to the spelling of the word newly inputted exists when word data corresponding to the spelling of the word previously inputted via said keyboard does not exist.

4. An electronic typewriter according to claim 3, wherein said spelling check control means comprises pass means for disabling the correction of said previously inputted word by said correcting control means and judging the spelling of said previously inputted word as correct in accordance with a depression of said pass key on said keyboard.

5. An electronic typewriter according to claim 4, wherein said visible outputting means comprises displaying means for displaying a word inputted via said keyboard, said displaying means controlled by said spelling check control means comprising special displaying means for specially displaying a misspelled word when said spelling check control means determines that word data corresponding to the spelling of said misspelled word does not exist.

6. An electronic typewriter comprising:
   (a) a keyboard generating a signal corresponding to a depressed key and comprising at least character keys for inputting character data, a space key for separating said inputted character data into groups, each of said groups forming an inputted word and a release key;
   (b) a dictionary memory for storing a plurality of word data;
   (c) a working memory for storing said inputted word;
   (d) a spelling check control means for reading word data from said dictionary memory and said inputted word from said working memory and comparing the spelling of said inputted word with said word data;
   (e) a text memory for storing data inputted via said keyboard;
   (f) a storing means for storing word data inputted via said keyboard in said text memory when the existence of said word data corresponding to the spelling of said word being inputted is confirmed by said spelling check control means;
   (g) means responsive to operation of said release key for disabling said spelling check control means, from checking the spelling of only a first word inputted after the depression of said release key of said keyboard and storing said first word inputted in said text memory and for reenabling said spelling check control means after said first word has been inputted; and (h) visible outputting means for displaying input data.

7. An electronic typewriter according to claim 6, wherein said disabling means further comprises:
   (f1) means for setting a digital signal indicative of the disabling of said spelling check control means in accordance with a depression of said release key;
   (f2) means for judging the state of said digital signal in accordance with a depression of said space key; and
   (f3) means for enabling said spelling check control means comprising resetting said digital signal.

8. An electronic typewriter according to claim 7, wherein said spelling check control means determines whether said corresponding word data exists every time said space key is depressed and comprises a correcting control means for storing a word newly inputted by said character keys and separated by said space key as a corrected word in said working memory without said space key or said pass key being depressed, said spelling check control means determining whether word data corresponding to the spelling of the word newly inputted exists when word data corresponding to the spelling of the word previously inputted via said keyboard does not exist.

9. An electronic typewriter according to claim 8, wherein said spelling check control means comprises pass means for disabling the correction of said previously inputted word by said correcting control means and judging the spelling of said previously inputted word as correct in accordance with a depression of said pass key on said keyboard.

10. An electronic typewriter according to claim 9, wherein said storing means stores a word inputted after the depression of said release key, words for which the same spelling of word data exists in said dictionary memory and words whose spelling is regarded as correct by said pass means in said text memory.

11. An electronic typewriter according to claim 10, wherein said visible outputting means comprises displaying means for displaying a word stored in said working memory and comprising special displaying means controlled by said spelling check control means for specially displaying a misspelled word when said spelling check control means determines that word data corresponding to the spelling of said misspelled word does not exist.

12. An electronic typewriter according to claim 11, wherein said visible outputting means comprises a printer for printing input data stored in said text memory on media in a bundle.

13. An electronic typewriter according to claim 9, wherein said visible outputting means comprises a printer being operated by said spelling check control means to print a word when said word is inputted after the depression of said release key.

14. An electronic typewriter according to claim 9, wherein said visible outputting means comprises a printer being operated by said spelling check control means to print a word when the same spelling of a word data for said word is judged to exist by said spelling check control means.

15. An electronic typewriter according to claim 9, wherein said visible outputting means comprises a printer being operated by said spelling check control means to print a word whose spelling is judged as correct by said pass means.

* * * * *